(12) United States Patent
Connell et al.

(10) Patent No.: US 12,067,654 B2
(45) Date of Patent: Aug. 20, 2024

(54) METHODS AND SYSTEMS FOR REDUCING ARTEFACTS IN IMAGE RECONSTRUCTION

(71) Applicant: University of Johannesburg, Johannesburg (CA)

(72) Inventors: Simon Henry Connell, Johannesburg (CA); Martin Nkululeko Hogan Cook, Johannesburg (CA)

(73) Assignee: University of Johannesburg, Johannesburg (ZA)

( * ) Notice: Subject to any disclaimer, the term of this patent is extended or adjusted under 35 U.S.C. 154(b) by 252 days.

(21) Appl. No.: 17/622,547

(22) PCT Filed: Jun. 24, 2020

(86) PCT No.: PCT/IB2020/055977
§ 371 (c)(1),
(2) Date: Dec. 23, 2021

(87) PCT Pub. No.: WO2020/261145
PCT Pub. Date: Dec. 30, 2020

(65) Prior Publication Data
US 2022/0358693 A1 Nov. 10, 2022

(30) Foreign Application Priority Data
Jun. 24, 2019 (ZA) .................. 2019/04070

(51) Int. Cl.
*G06T 11/00* (2006.01)
*G06T 7/00* (2017.01)

(52) U.S. Cl.
CPC .......... *G06T 11/008* (2013.01); *G06T 7/0004* (2013.01); *G06T 2207/10104* (2013.01);
(Continued)

(58) Field of Classification Search
None
See application file for complete search history.

(56) References Cited

U.S. PATENT DOCUMENTS

| | | | |
|---|---|---|---|
| 5,903,008 A * | 5/1999 | Li | G01T 1/1647 250/363.04 |
| 2011/0007958 A1* | 1/2011 | Salomon | G06T 7/149 382/128 |

(Continued)

OTHER PUBLICATIONS

Nuyts, Johan, et al., "Simultaneous Maximum A Posteriori Reconstruction of Attenuation and Activity Distributions from Emission Sinograms", IEEE Transactions on Medical Imaging, IEEE Service Center, Piscataway, NJ, US, vol. 18, No. 5, May 1999 (May 1999), XP055610294, ISSN: 0278-0062.

Nemakhavhani, T., et al., "The MinPET diamond discovery technique", Proceedings of the South African Institute of Physics Conference 2017 (SAIP2017), Jul. 7, 2017 (Jul. 7, 2017), XP055610294, Retrieved from the Internet: URL:http://events.saip.org.za/getFile.py/access?resId=61&materialId=8&confId=91 [retrieved on Aug. 1, 2019].

(Continued)

*Primary Examiner* — Marcus H Taningco
(74) *Attorney, Agent, or Firm* — Knobbe, Martens, Olson & Bear, LLP

(57) ABSTRACT

The invention relates to methods and systems for reducing artefacts in image reconstruction employed in tomographic imaging including Positron Emission Tomography (PET) and Computer Assisted Tomography (CAT) or (CT). The method is carried out entirely or in part by a computer or computerised system communicatively coupled to a detector arrangement which comprises a plurality of detector elements, wherein the detector elements are configured to detect photons associated with an object during PET and CAT screening processes in at least medical and mining applications.

18 Claims, 7 Drawing Sheets

(52) U.S. Cl.
CPC ............... *G06T 2207/20081* (2013.01); *G06T 2207/30181* (2013.01); *G06T 2211/424* (2013.01)

(56) References Cited

U.S. PATENT DOCUMENTS

| | | | |
|---|---|---|---|
| 2013/0243298 A1* | 9/2013 | Bredno | G06T 5/50 382/131 |
| 2014/0056500 A1* | 2/2014 | Bal | G06T 11/005 382/131 |
| 2020/0134886 A1* | 4/2020 | Tsui | A61B 5/08 |

OTHER PUBLICATIONS

International Search Report issued in PCT Application No. PCT/IB2020/055977, dated Nov. 5, 2020.

\* cited by examiner

METHODS AND SYSTEMS FOR REDUCING ARTEFACTS IN IMAGE RECONSTRUCTION

CROSS REFERENCE TO RELATED APPLICATIONS

This application is a U.S. National Phase Application of PCT International Application Number PCT/IB2020/055977, filed on Jun. 24, 2020, designating the United States of America and published in the English language, which is an International Application of and claims the benefit of priority to South African Patent Application No. 2019/04070, filed on Jun. 24, 2019. The disclosures of the above-referenced applications are hereby expressly incorporated by reference in their entireties.

FIELD OF THE INVENTION

This invention relates, generally, to image reconstruction in tomographic imaging including Positron Emission Tomography (PET) and Computer Assisted Tomography (CAT) or (CT). More specifically, the invention relates to a method of reducing artefacts in tomographic image reconstruction. The invention also relates to a system for reducing artefacts in tomographic image reconstruction.

BACKGROUND OF THE INVENTION

One of the challenges with creating tomographic images of objects (using ionising radiation) is that various physical effects, in particular scattering and attenuation of imaging radiation, lead to distortions, or "artefacts" within reconstructed images that degrade image quality. Scattering refers to a physical process that changes the direction of a particle, and attenuations to a physical process that reduces the intensity of radiation, for example absorption of some of the particles.

The two most important types of imaging processes are generally Positron Emission Tomography (PET) and Computer Assisted Tomography (CAT) or Computerised Tomography (CT), hereafter referred as CAT. PET uses radiation generated within an object from nuclear decay, and the image quality is adversely affected by both scattering and attenuation of outgoing radiation. CAT scans rely upon X-rays that are generated on one side of an object, and imaged on the other side via a suitable detector arrangement. In this case, the attenuation of the X-rays is the physical process that is measured, and it therefore does not need to be compensated for, but scattering still leads to image degradation.

In this present disclosure, reference is made to PET in the Mining environment (MinPET) to explain the invention, as claimed, of correcting for attenuation and scattering in the image reconstruction process as it was initially the problem facing the inventors. However, it will be understood by those skilled in the art that the Inventors have also identified that the teachings of the present disclosure apply mutatis mutandis to other tomographic processes such as Medical (clinical and research) PET and CAT scan processes as resultant tomographic images associated with these tomographic processes also suffer similar drawbacks of artefacts therein.

By way of background with respect to conventional diamond mining operations, vast amounts of resources such as water and energy are required to process mostly barren rock in order to recover diamonds. Processing of the rock typically includes a damaging sequence of rock crushing and diamond recovery, often with a relatively low yield, for example, approximately 1 carat per ton of rock processed. However, crushing of rock in a conventional fashion may lead to diamond breakage, thereby reducing the profitability of a diamond mine.

Sensor- or detector-based technologies attempt to negate these undesirable effects by enabling early detection of relatively unprocessed diamond bearing rocks (e.g. kimberlite) which can then be isolated and processed in a more environmentally friendly manner that preserves diamond integrity.

Positron emission tomography (PET) enables detection of minerals, and particularly diamonds, in rocks. This approach involves irradiating a rock with a gamma ray beam from bremsstrahlung of, for example, 40 MeV electrons, or a different source of photons other than bremsstrahlung, for example, inverse Compton scattering, or other techniques. The rock returns to moderate levels of specific activity within minutes, by which time the PET isotopes represent the dominant residual activity. When the $^{11}$C pet isotope is the dominant activity, after about 30 minutes, the rock is then inspected by way of a detector arrangement to determine whether or not there is a diamond present therein. The detector arrangement typically includes a plurality of individual detector elements. For instance, a detector arrangement may include a pair of spaced apart detector arrays oriented parallel to each other, with each array consisting of a number of individual detector elements.

Classification data generated when using the PET approach is usually associated with photons detected by the detector arrangement. These photons are emitted from the rock as a result of positron annihilation in the rock. When a PET isotope in the rock releases a positron particle through beta-decay, the positron annihilates with a nearby electron after following a path that can involve multiple scattering events. The most common outcome of this annihilation is the production of nearly co-linear back-to-back 511 keV gamma ray photons. Each photon travels through the surrounding material, sometimes changing energy and direction along the way. When the photons reach the detector arrangement, the detector arrangement may output classification data in the form of detector strike/hit event data.

Usually, two back-to-back photons must be detected at approximately the same time in opposite planes of the detector arrangement (e.g. above and below the kimberlite rock analysed for diamonds) to form a line of response (LoR). In the context of this specification, the term "event" means a photon registered by one detector element, with information that may include energy, position and time associated with the event. A LoR is two matched events from opposite detector units that arrived within a short time window (known as the coincidence window) and are therefore deemed to have originated from the same positron annihilation. The coincidence window defines the maximum time between coincident events for a given detection system to designate such events as a LoR. In other words, if the difference in detection time of two co-linear events is less than the coincidence window, they are classified as coincident and define a LoR.

In many cases, it is necessary to generate/reconstruct some sort of image (referred to herein as a reconstructed image) based on the raw data obtained by the detector arrangement, with such an image preferably highlighting the areas of interest. In diamond detection PET, it is desirable to generate an image showing the PET isotope density distribution in the rock so as to identify probable diamond-containing zones.

To reconstruct an image of the PET isotope density distribution, a three-dimensional (3D) model can be obtained from a four-dimensional (4D) sinogram. The sinogram consists of the complete set of detector data obtained by the detector arrangement, typically after binning LoRs by angle and position. For instance, the sinogram may be formed by binning the LoRs into a set of transverse (x,y) projections for a set (θ, φ) of angles. In the case where the detector arrangement comprises a pair of detector arrays as described above, the sinogram is a 4D object, indexed by two angles in spherical coordinates, θ and φ, and two position coordinates along the plane midway between the two detector arrays, u and v. In the context of this specification, the 3D model or image formed is referred to as a "PET reconstructed image", "tomographic reconstructed image", "reconstructed tomographic image", a "reconstructed image", "reconstruction of a tomographic image", or "tomographic image".

In the context of mineral detection PET, the PET reconstructed image thus refers to a 3D model of the PET isotope density distribution, obtained from the 4D sinogram. In this specification, a "projection" refers to a subset of the 4D sinogram corresponding to one particular selection of the angles θ and φ. A projection is thus a two-dimensional (2D) object, indexed by u and v. Furthermore, a "projection element" refers to one element of a projection, i.e. the value of a projection for a given u and v. This represents the combined value of all of the LoRs with similar angles and positions that were grouped into one bin.

The Inventors are aware of several techniques that can be used to convert the sinogram into a PET reconstructed image as a quantitative 3D image of source points. They have found that, currently, the most sophisticated technique is based on an iterative algorithm, which is designed to find the most likely original 3D source point density. The PET reconstructed image is essentially a processed form of the raw data obtained by the detector arrangement and some information is lost during processing.

As touched on above, a problem associated with PET image reconstruction using known iterative methods is that systematic artefacts are introduced into the PET reconstructed image if the reconstruction process does not take into account the effects of attenuation and scattering of the two back-to-back, co-linear and co-incident photons as they travel through the medium in question (e.g. kimberlite). The Inventors have found that, as a result of these effects, typically only as little as 3% of the photons may be usable in the LoR construction process. Many attenuated photons are lost, and scattered photons may lead to false LoR construction. When, on average, the path length of LoRs in the rock is longer than the X-ray attenuation length, then the effect is stronger. Gaps in the rock bed and the position of the PET isotope source point in the rock affect this path length. The Inventors have found that a PET image reconstruction method that does not take this into account treats an increased manifestation of LoRs associated with open areas or edge areas as increased concentrations of PET source points. For example, a single spherical rock which has a uniform distribution of PET isotope source points would be reconstructed as having a radially increased distribution of PET isotope source points.

To illustrate the problems that may arise when not taking attenuation and/or scattering into account, consider a pair of detector elements, e.g. one detector element from a first array in a detector arrangement and an opposing detector element from a second array in the detector arrangement. The number of LoRs detected by this pair is proportional to the number of PET isotope nuclei in a line between them. The absorption or scattering of photons, which reduces the number of true LoRs detected, is an exponential decay based on the path length of photons through the rock. This effect is far more pronounced in PET applications for detecting diamonds compared to medical PET, because rock is significantly more likely to scatter or absorb photons per unit length than biological tissue. In total, one would expect the number of LoRs, N, between detector elements to be approximately proportional to the product of the path length, x, as this determines the number of source nuclei, and also to the decaying exponential function from linear attenuation:

$$N \sim xe^{-\mu x} \quad (1)$$

The formula (1) has a maximum at the point $x=1/\mu$. After this point, adding more material decreases the signal observed in each pixel of each projection.

However, it will be appreciated that the true situation is more complex than the simple formula (1) above implies. In practice, photons are not simply either absorbed or not. Instead, they can follow complex paths through the rock, with several scattering events, each of which can change their direction and energy. In order properly to reconstruct images, one must therefore consider the effects of attenuation and scattering.

To further illustrate the negative consequences of not taking attenuation and/or scattering of photons into account, FIGS. 1 and 2 illustrate a first example of artefacts which may be introduced into a PET reconstructed image. A kimberlite orb 2 with a uniform distribution of diamond containing material and a central void, shown in FIG. 1, was simulated using Geant4's Monte Carlo particle tracking code. The simulation follows PET isotope annihilations, positron thermalisation and annihilation, followed by tracking of the annihilation photons through all materials, including all photon-material interactions, and then ultimately the detector response. Single e vents are matched to form coincidence events which form LoRs, and these are reconstructed into a PET image using an iterative algorithm that does not have attenuation correction. The reconstructed image is illustrated in FIG. 2.

Two types of artefacts are visible in FIG. 2, which is a "slice" of the reconstructed orb 3 (generated using a known iterative technique). Firstly, the kimberlite near the edges 4 of the orb 3 are incorrectly amplified. This is because LoRs from points near the edges 4 have a large set of angles available along which they can reach the opposite detectors, where the path length through kimberlite is small. Source positions near the centre 5, on the other hand, have to pass through the majority of the rock diameter no matter the orientation of the LoR. The second type of artefact is within the void. This is actually filled with air, and no PET events could originate from within it. However, in the reconstructed image of the orb 3, the density of PET isotopes is shown as being higher in the void than outside of the orb 3. This is due to the effect of the void reducing the path length through kimberlite of LoRs that pass through it.

FIGS. 3 and 4 illustrate a second example of artefacts that may arise when using known iterative reconstructive techniques. Four orbs 6 are positioned in a tetrahedral arrangement as is best shown in FIG. 3. In the centre 7, between the orbs 6, there should be a position of no activity as there is no rock, but this is again reconstructed as having higher activity, as shown in FIG. 4. In other words, the area 9 between the reconstructed orbs 8 should actually show no activity, but is incorrectly reconstructed as a result of the effects explained above.

FIGS. 1 to 4 are shown merely as examples of the problems associated with not compensating for these effects. With more complex arrangements and shapes of kimberlite rocks, the image artefacts resulting from attenuation and scattering are significantly more complex.

It is desirable to have the most fidelity possible when forming a PET reconstructed image, as this image must represent, as accurately as possible, the actual PET isotope density distribution in the rock. Embodiments of the invention thus aim to reduce artefacts in PET image reconstruction.

In the context of this specification, the term "object" may be understood to mean a rock particle such as kimberlite, irrespective of the size thereof, or a loose diamond. Thus the terms "object", "rock", and "kimberlite" may be used interchangeably herein. However, the term "object" may also extend to other objects which are imaged or analysed in a detection method, and is thus not limited to rock. In this regard, the object may be organic tissue, and may be a human or animal body, or part thereof.

SUMMARY OF THE INVENTION

In accordance with one embodiment of the invention, there is provided a method of reducing artefacts in tomographic image reconstruction, wherein the method is carried out entirely or in part by a computer or computerised system communicatively coupled to a detector arrangement which comprises a plurality of detector elements, wherein the detector elements are configured to detect photons associated with an object, the method comprising:

generating or obtaining an initial reconstruction of a tomographic image associated with the object, the tomographic image being at least partially based on lines of response (LoRs) detected by the detector arrangement, wherein the tomographic image includes a plurality of voxels associated with a volume or region analysed by the detector arrangement;

defining or obtaining a system matrix which relates each voxel in the tomographic image to the detector elements;

generating or obtaining an attenuation map, wherein the attenuation map is based on the tomographic image and is defined by a plurality of voxels, each voxel of the attenuation map containing voxel information relating to a degree or probability of attenuation and/or scattering associated with that voxel;

performing one iteration of an iterative tomographic reconstruction algorithm to update the tomographic image, wherein performing the iteration includes updating the system matrix based on the voxel information of the attenuation map;

updating the attenuation map based on the updated tomographic image; and repeating the one iteration of the reconstruction algorithm and the updating of the attenuation map until the tomographic image converges to define a tomographic reconstructed image, thereby reducing artefacts in the tomographic image by compensating for, or taking into account, attenuation and/or scattering of the photons associated with the object.

The method may be for reducing artefacts in a positron emission tomography (PET) image reconstruction by compensating for, or taking into account, attenuation and/or scattering of photons emitted from the object. In this regard, the tomographic image is in the form of a PET image associated with the object, wherein the detector elements are configured to detect photons emitted from an object as a result of positron annihilation due to irradiation of the object with photons of a predetermined energy, wherein the PET image is indicative of a PET isotope density distribution in a volume or region analysed by the detector arrangement.

The system matrix may relate each voxel in the PET image to every possible pair of detector elements.

The method may be for reducing artefacts in a Computer Assisted Tomography (CAT) image reconstruction by compensating for, or taking into account, scattering of photons from a source as it interacts with the object. In this regard, the tomographic image may be in the form of a CAT image associated with the object, wherein the detector elements are configured to detect photons from a source passing through the object, wherein the CAT image is indicative of a material density and/or electron density in the object analysed by the detector arrangement. The system matrix may relate each voxel in the CAT image to every possible LoR from the source to the detector elements.

In the case of CAT, it will be appreciated by those skilled in the art that the LoR may be between an X-ray source and a detector hit position. In other words, the X-rays or X-ray photon path from the X-ray source to the detector arrangement may be the LoR.

For CAT, the LoRs are binned to get the sinograms which are reconstructed to get 3D quantitative images in the similar fashion to PET. In this regard, the term "tomographic image" as described herein may thus refer to both PET and CAT images. In particular, as described above with respect to PET images, the CAT images may also be referred to as "CAT reconstructed image", "tomographic reconstructed image", "reconstructed tomographic image", or simply a "reconstructed image".

It will be appreciated that the CAT image may be in the form of a 3D voxelized image similar to the PET image described herein and thus the explanations relating to PET images apply, mutatis mutandis, to CAT images. The quantity imaged in each voxel may be similar to a density of electrons, to first order. It follows that in its simplest appreciation, the CAT image may be a function of the material density and the electron density per element in the material. CAT images may then be segmented/separated to different materials. In PET images, the density of the PET isotopes within the materials themselves are segmented.

It will further be appreciated that the CT scan 3D image itself may be the same as or substantially similar to the attenuation map. This is because the imaging represents the "attenuation strength" of the materials. In a mining application of the present disclosure, herein referred to as MinPET, kimberlite and diamond are both PET active, so the PET image/map can be taken as giving a rough indication of the material distributions and therefore of the attenuation map. In the medical applications of PET, the primary PET map is from function (how PET isotopes are metabolised into tissue), not form (the material and their shapes). In this regard, the method may comprise receiving a CAT scan to get the attenuation map, with which to do the correction.

In this regard, one often finds Medical PET and CAT together, so as to get function and form, and then compare. For correction of a CAT scan, it is its own attenuation map, so that is used to correct the scattering effect. The method may comprise generating or obtaining a CAT image of an object, and using the CAT image as the attenuation map.

For the MinPET and Medical PET, attenuation and scattering is corrected, not just scattering as in the case of CAT.

In accordance with another aspect of the invention, there is provided a system for reducing artefacts in tomographic image reconstruction, wherein the system comprises a computer or computerised system communicatively coupled to a detector arrangement which comprises a plurality of detector elements, wherein the detector elements are configured to detect photons associated with an object, wherein the computer or computerised system is configured to:

generate or obtain an initial reconstruction of a tomographic image associated with the object, the tomographic image being at least partially based on lines of response (LoRs) detected by the detector arrangement, wherein the tomographic image includes a plurality of voxels associated with a volume or region analysed by the detector arrangement;

define or obtain a system matrix which relates each voxel in the tomographic image to the detector elements;

generate or obtain an attenuation map, wherein the attenuation map is based on the tomographic image and is defined by a plurality of voxels, each voxel of the attenuation map containing voxel information relating to a degree or probability of attenuation and/or scattering associated with that voxel;

perform one iteration of an iterative tomographic reconstruction algorithm to update the tomographic image, wherein performing the iteration includes updating the system matrix based on the voxel information of the attenuation map;

update the attenuation map based on the updated tomographic image; and repeat the one iteration of the reconstruction algorithm and the updating of the attenuation map until the tomographic image converges to define a tomographic reconstructed image, thereby reducing artefacts in the tomographic image by compensating for, or taking into account, attenuation and/or scattering of the photons associated with the object.

In accordance with another aspect of the invention, there is provided a method of reducing artefacts in tomographic image reconstruction, wherein the method is carried out by a computer or computerised system communicatively coupled to a detector arrangement which comprises a plurality of detector elements, wherein the detector elements are configured to detect photons associated with an object, wherein the method comprises using a trained machine-based learning imager to generate a reconstructed tomographic image associated with the object, wherein the imager is trained at least with computer simulated images and/or object data from a computer implemented simulator to compensate for, or take into account, attenuation and/or scattering of the photons associated with the object, thereby to reduce artefacts in the reconstructed image.

In accordance with another aspect of the invention, there is provided a system for reducing artefacts in tomographic image reconstruction, wherein the system comprises a computer or computerised system communicatively coupled to a detector arrangement which comprises a plurality of detector elements, wherein the detector elements are configured to detect photons associated with an object, wherein the computer or computerised system is configured to detect photons associated with an object, wherein the method comprises using a trained machine-based learning imager to generate a reconstructed tomographic image associated with the object, wherein the imager is trained at least with computer simulated images and/or object data from a computer implemented simulator to compensate for, or take into account, attenuation and/or scattering of the photons associated with the object, thereby to reduce artefacts in the reconstructed image.

In accordance with another aspect of the invention, there is provided a method of reducing artefacts in tomographic image reconstruction, wherein a reconstructed tomographic image is generated by a computer or computerised system communicatively coupled to a detector arrangement which comprises a plurality of detector elements, wherein the detector elements are configured to detect photons associated with objects, the method comprising filling voids between or in the objects with predefined material or materials prior to analysing the objects with the detector arrangement.

In accordance with another aspect of the invention, there is provided a method of reducing artefacts in positron emission tomography (PET) image reconstruction, wherein the method is carried out by a computer or computerised system communicatively coupled to a detector arrangement which comprises a plurality of detector elements, wherein the detector elements are configured to detect photons emitted from an object as a result of positron annihilation due to irradiation of the object with photons of a predetermined energy, the method comprising:

generating or obtaining an initial reconstruction of a PET image associated with the object, the PET image being at least partially based on lines of response (LoRs) detected by the detector arrangement, wherein the PET image includes a plurality of voxels and is indicative of a PET isotope density distribution in a volume or region analysed by the detector arrangement;

defining or obtaining a system matrix which relates each voxel in the PET image to every possible pair of detector elements;

generating or obtaining an attenuation map, wherein the attenuation map is based on the PET image and is defined by a plurality of voxels, each voxel of the attenuation map containing voxel information relating to a degree or probability of attenuation and/or scattering associated with that voxel;

performing one iteration of an iterative PET reconstruction algorithm to update the PET image, wherein performing the iteration includes updating the system matrix based on the voxel information of the attenuation map;

updating the attenuation map based on the updated PET image; and repeating the one iteration of the reconstruction algorithm and the updating of the attenuation map until the PET image converges to define a PET reconstructed image, thereby reducing artefacts in the PET image by compensating for, or taking into account, attenuation and/or scattering of the photons emitted from the object.

The method may include using additional sensor data to generate, obtain and/or update the attenuation map.

In accordance with another aspect of the invention, there is provided a method of reducing artefacts in PET image reconstruction, wherein the method is carried out by a computer or computerised system communicatively coupled to a detector arrangement which comprises a plurality of detector elements, wherein the detector elements are configured to detect photons emitted from an object as a result of positron annihilation due to irradiation of the object with photons of a predetermined energy, the method comprising using a trained machine-based learning imager to generate a PET reconstructed image indicative of a PET isotope density distribution in a volume or region analysed by the detector arrangement, wherein the imager is trained at least with computer simulated images and/or object data from a computer implemented simulator to compensate for, or take into account, attenuation and/or scattering of the photons emitted from the object, thereby to reduce artefacts in the PET reconstructed image.

In accordance with another aspect of the invention, there is provided a system for reducing artefacts in PET image reconstruction, the system comprising at least one computer or computerised system communicatively coupled to a detector arrangement which comprises a plurality of detector elements, wherein the detector elements are configured to detect photons emitted from an object as a result of positron annihilation due to irradiation of the object with photons of a predetermined energy, and wherein the computer or computerised system is configured to perform a method substantially as described above.

In accordance with a further aspect of the invention, there is provided a diamond mine processing system which includes a system substantially as described above.

In accordance with a still further aspect of the invention, there is provided a computer program product including at least one computer-readable medium having stored thereon at least one computer program which, when executed by a computer or a computerised system, causes the computer or computerised system to perform a method substantially as described above. The computer-readable medium may be a non-transitory computer-readable medium.

In accordance with yet a further aspect of the invention, there is provided a method of reducing artefacts in PET image reconstruction, wherein a PET reconstructed image is generated by a computer or computerised system communicatively coupled to a detector arrangement which comprises a plurality of detector elements, wherein the detector elements are configured to detect photons emitted from objects as a result of positron annihilation due to irradiation of the objects with photons of a predetermined energy, the method comprising filling voids between or in the objects with predefined material or materials prior to analysing the objects with the detector arrangement.

The material may be glass beads, fluid, or the like.

It will be understood to those skilled in the art that comments above pertaining to one aspect of the invention may apply, mutatis mutandis, to the other aspects of the invention.

DETAILED DESCRIPTION WITH REFERENCE TO THE DRAWINGS

The following description of the invention is provided as an enabling teaching of the invention. Those skilled in the relevant art will recognise that many changes can be made to the embodiments described, while still attaining the beneficial results of the present invention. It will also be apparent that some of the desired benefits of the present invention can be attained by selecting some of the features of the present invention without utilising other features. Accordingly, those skilled in the art will recognise that modifications and adaptations to the present invention are possible, and may even be desirable in certain circumstances, and are a part of the present invention. Thus, the following description is provided as illustrative of the principles of the present invention and not a limitation thereof.

It will be appreciated that the phrase "for example," "such as", and variants thereof describe non-limiting embodiments of the presently disclosed subject matter. Reference in the specification to "one example embodiment", "another example embodiment", "some example embodiment", or variants thereof means that a particular feature, structure or characteristic described in connection with the embodiment(s) is included in at least one embodiment of the presently disclosed subject matter. Thus, the use of the phrase "one example embodiment", "another example embodiment", "some example embodiment", or variants thereof does not necessarily refer to the same embodiment(s).

Unless otherwise stated, some features of the subject matter described herein, which are, described in the context of separate embodiments for purposes of clarity, may also be provided in combination in a single embodiment. Similarly, various features of the subject matter disclosed herein which are described in the context of a single embodiment may also be provided separately or in any suitable sub-combination.

Figure 1:
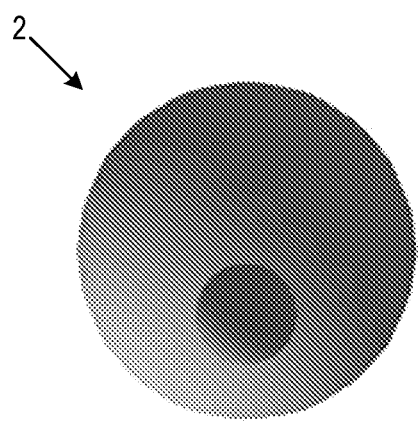
FIG. 1 shows a three-dimensional representation of a simulated kimberlite orb with a central void.
Figure 2:
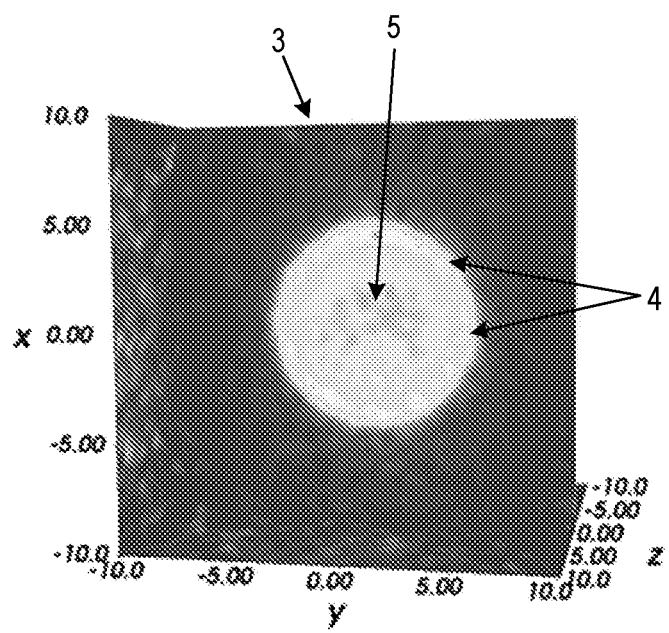
FIG. 2 shows a three-dimensional representation of a "slice" taken through a PET reconstructed image of the orb of FIG. 1, wherein the image was reconstructed using a known iterative technique.
Figure 3:
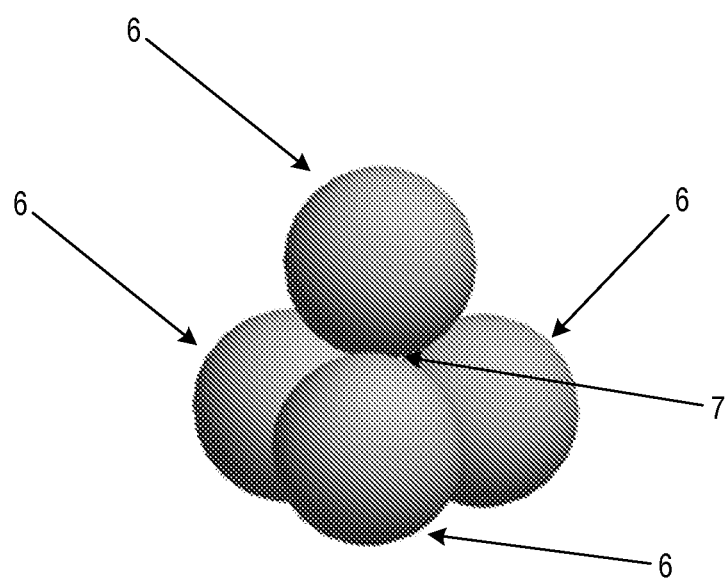
FIG. 3 shows a three-dimensional representation of four simulated kimberlite orbs in a tetrahedral arrangement.
Figure 4:
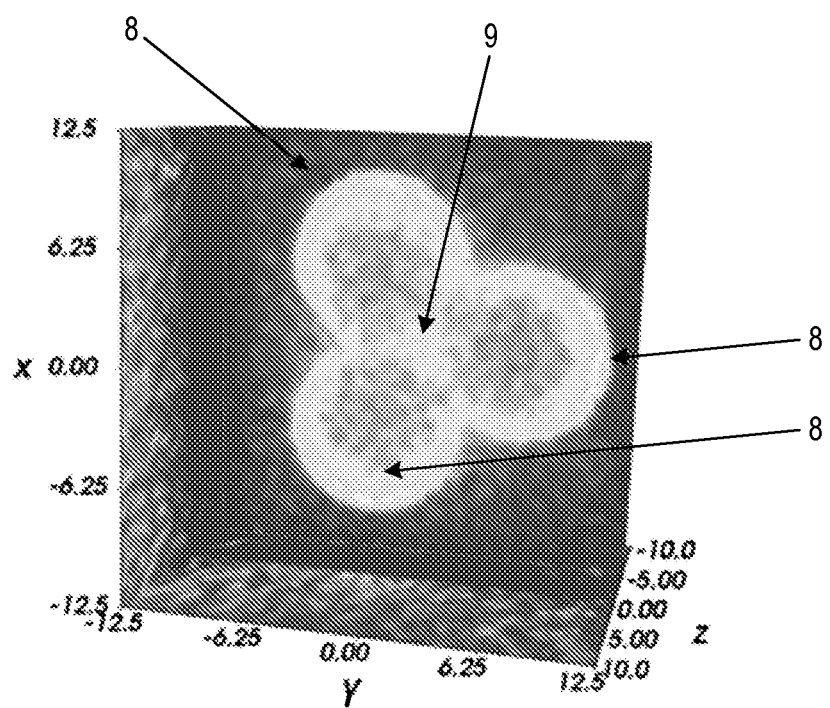
FIG. 4 shows a three-dimensional representation of a "slice" taken through a PET reconstructed image of the arrangement of FIG. 3, wherein the image was reconstructed using a known iterative technique.
Figure 5:
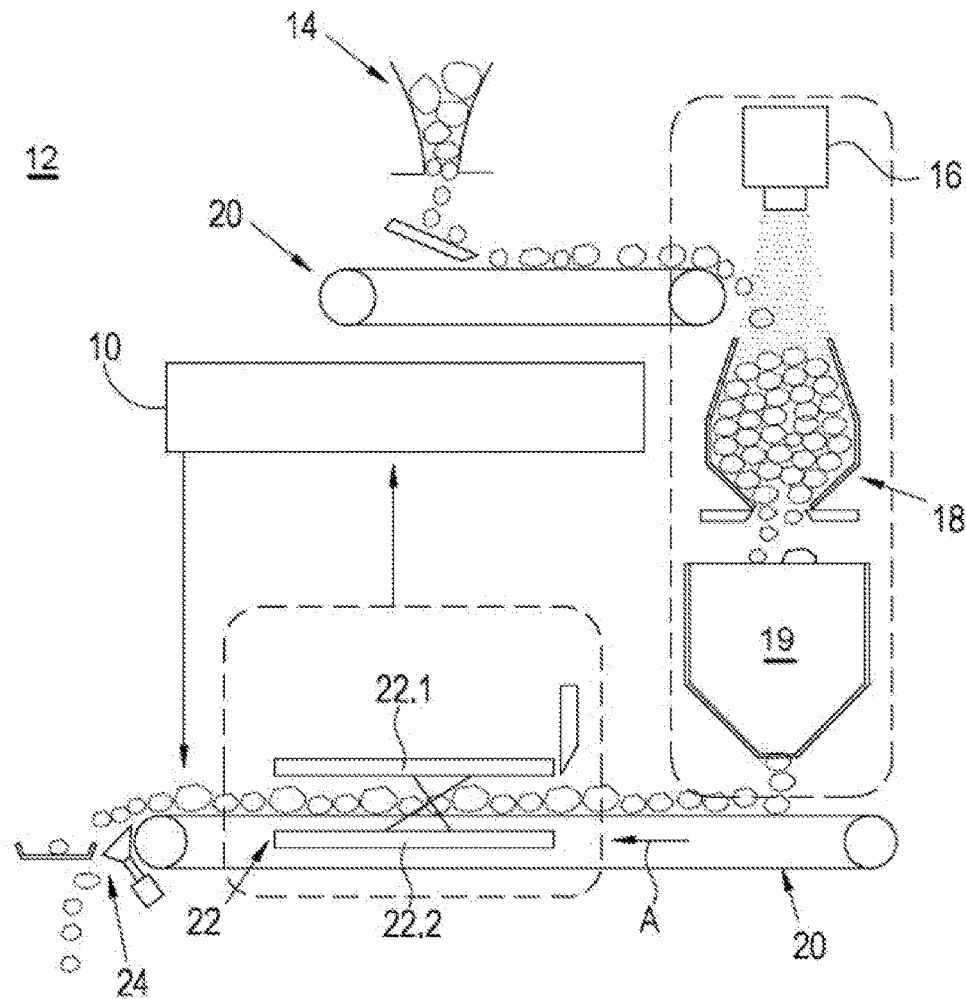
FIG. 5 shows a schematic diagram of an example of a diamond mine processing system in which embodiments of the invention may be implemented.

Referring now to FIG. 5 of the drawings, an example of a diamond mine processing system is generally indicated by reference numeral 12. Diamond detection will be used as an example implementation of embodiments of the invention in this description. However, it should be appreciated that alternative embodiments extend to other types of detection and image reconstruction, particularly in high volume and high rate environments. The teachings described herein may apply mutatis mutandis to other tomographic imaging techniques such as PET and/or CAT/CT in order to reduce image artefacts due to attenuation and/or scattering.

The diamond mine processing system 12 typically includes a classification or detection system 10 which is usually a computerised system configured to perform imaging and to detect diamonds as individual, separate objects, as embedded in host objects or as objects included in a mass of other objects. Of particular relevance to the present invention is that the system 12 is configured to generate PET reconstructed images of rock to facilitate the detection of diamonds.

The diamond mine processing system 12 may be located at or adjacent a diamond mine and may comprise suitable conventional mining equipment such as a crusher 14 to coarsely crush mined rock (e.g. kimberlite) to sizes of approximately 160 mm diameter, or less. The system 12 further comprises a suitable irradiator 16 to irradiate the crushed rock with photons. The photons which irradiate the rock may be from gamma ray beams from bremsstrahlung of approximately 40 MeV electrons. Instead, or in addition, these photons may be from inverse Compton scattering, plasma wakefield device, or the like. The photons are at an energy at which giant dipole resonance (GDR) occurs due to a nuclear reaction between the photons and carbon in the rock.

The system 12 comprises a hopper arrangement 18, 19 configured to hold the irradiated rock for a predetermined period of time. The irradiated rock returns to moderate levels of specific activity within minutes, by which time PET isotopes represent the dominant residual activity. In this regard, the hopper arrangement 18, 19 is configured to hold the irradiated rock for a hold-time of between twenty and thirty minutes at which time the $^{11}$C PET isotope is the dominant activity. The hopper arrangement 18, 19 may then automatically release the rock after the hold-time.

The system 12 comprises a conveyor arrangement 20 comprising suitable conveyor belts which are non-attenuating to PET photons to transport rock in the system 12 in an automated fashion. The conveyor arrangement 20 may be configured to transport rock in a rock stream at a constant predetermined speed in the system 12, for example, 1 m per second.

The system also comprises a detector arrangement 22 which is located downstream from the hopper arrangement 18, 19 and adjacent the conveyor arrangement 20, particularly the belt thereof, so as to detect PET photons emitted therefrom.

Figure 6:
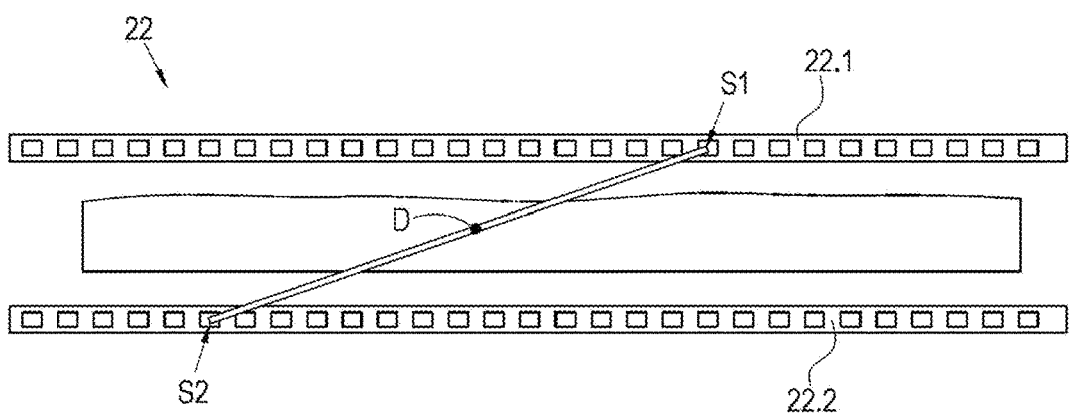
FIG. 6 shows an illustration of kimberlite rock on a moving belt between detector arrays, or planes, of a detector arrangement in accordance with an example embodiment of the invention, showing two coincident back-to-back 511 keV gamma rays, which together form a LoR.
Figure 7:
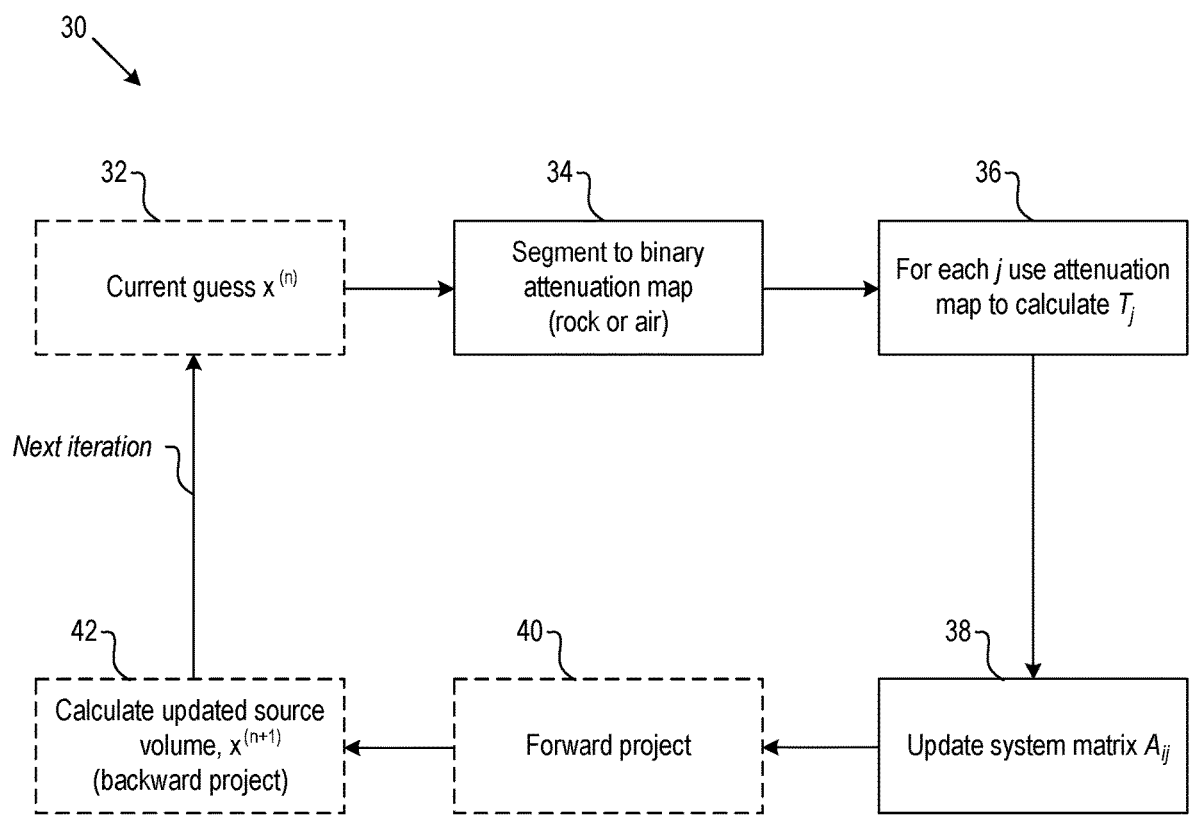
FIG. 7 shows a block diagram illustrating an example of a method that may be employed to reduce artefacts in PET image reconstruction by performing attenuation correction.

In one example embodiment, and as shown in FIGS. 5 and 6, the detector arrangement 22 may comprise a pair of detector arrays 22.1 and 22.2 (detector planes) which are located above and below the belt, respectively, so as to be seen to effectively sandwich the belt and rock travelling thereon. In other embodiments the detector arrangement may be configured differently, e.g. it may be substantially cylindrical such that it circumscribes the belt.

The array 22.1 may define a top detector plane which consists of a plurality of individual detector elements or detector units and the array 22.2 may define a bottom detector plane which consists of a plurality of individual detector elements or detector units. The arrays 22.1, 22.2 have sensing axes which are substantially transverse to a direction of travel A of the rock. In this example embodiment, the detector arrangement 22 comprises detectors suitable for detecting photons. In this regard the detectors of the arrangement 22 may be in the form of scintillator crystals and photomultiplier tubes (PMT) or similar sensors with suitable electronics.

The system 12 also comprises a suitable sorter 24 which may be an electronically controlled mechanical sorter 24 configured to sort potentially diamondiferous, in other words diamond containing rocks, or loose diamonds from potentially barren rocks or in other words rocks without diamonds therein.

The detection system 10 is communicatively coupled to the detector arrangement 22 and to the sorter 24 so as to receive classification data from the detector arrangement 22, generate PET reconstructed images, and to generate suitable control signals based on the reconstructed images to control the sorter 24 to sort diamondiferous rocks from barren rocks. In this regard, it is important for the system 10 to process the data with sufficient speed in order to be able to send activation signals to the sorter 24 in time.

The sorter 24 may be configured to sort diamonds or diamondiferous rocks into one or more categories according to one or more specific properties of the diamond/diamondiferous rock detected, as opposed to simply sorting the same from barren rocks.

The system 10 may be coupled to the detector arrangement 22 and/or the sorter 24 in a hardwired fashion, or in a wireless fashion. In one example embodiment, the system 10 is communicatively coupled to the arrangement 22 via a communications network which may comprise one or more different types of communication networks. In this regard, the communication network may be one or more of the Internet, a local area network (LAN), a wide area network (WAN), a metropolitan area network (MAN), various types of telephone networks (e.g., Public Switch Telephone Networks (PSTN) with Digital Subscriber Line (DSL) technology) or mobile networks (e.g., Global System Mobile (GSM) communication, General Packet Radio Service (GPRS), Code Division Multiple Access (CDMA), and other suitable mobile telecommunication network technologies), or any combination thereof. It therefore follows that though it may not necessarily be practical, it is envisaged that in some example embodiments, the system 10 need not be at the site of the mine but may be remote therefrom. In some embodiments, the arrangement 22 may form part of the system 10.

The system 10 is configured/programmed to receive classification data, or raw data, and to determine whether or not the object is potentially a diamond or diamondiferous by processing the received classification data. The classification data is typically associated with photons detected by the arrangement 22 which are emitted from the object as a result of positron annihilation in the irradiated object received from the hopper 18. In particular, referring to FIG. 6 of the drawings, when a PET isotope in the kimberlite rock releases a positron particle through beta-decay, the positron annihilates with a nearby electron. As explained in the "Background" section above, the most common outcome of this annihilation is the production of nearly co-linear back-to-back 511 keV gamma ray photons. Each photon then travels through the surrounding material, sometimes changing energy and direction along the way. When the photons reach the detector arrangement arrays 22.1, 22.2 at S1, S2, the arrangement 22 outputs classification data in the form of detector strike/hit event data, for example, which comprises data indicative of the location of the hit on the arrays 22.1, 22.2, the energy of the photon, and a time stamp. This allows the position of a diamond (see, as an example, "D" in FIG. 6) to be determined or estimated.

As also explained in the "Background" section above, to reconstruct an image of the PET isotope density distribution, a 3D model can be obtained from a 4D sinogram. The sinogram consists of the complete set of detector data obtained by the detector arrangement 22, after binning LoRs by angle and position. An iterative algorithm is commonly used to find the most likely original 3D source point density, and thereby to construct the 3D model.

However, in their experience with known techniques, the Inventors have found that artefacts are introduced into the PET reconstructed image if the reconstruction process does not take into account the effects of attenuation and scattering of the photons as they travel through the rock. Embodiments of the invention seek to address this. Different methods of compensating for attenuation and/or scattering may be employed. Firstly, it is possible to use mathematical algorithm(s) which model the effect using only the evolving approximation delivered by a PET reconstruction algorithm. Secondly, a PET reconstruction algorithm can be assisted with data fusion technologies by obtaining additional data on the rock stream geometry from other sensors. Thirdly, the gaps between or in rock which lead to or increase artefacts can be filled with specific material. Fourthly, artificial intelligence (AI) can be employed to produce substantially artefact free images by learning how to compensate for attenuation and scattering. These methods, which may alone or in combination be employed by the system 10 or any other component of the system 12 to reduce artefacts in PET image reconstruction, will each be described below.

The first technique discussed herein is the use of algorithms which model the attenuation and/or scattering effect using only the evolving approximation delivered by a PET reconstruction algorithm.

As a rough estimation, the volume that is being imaged by the system 12 of FIG. 5 consists of two types of material: the activated rock, which has PET source isotopes, and gaps between activated rock which have no PET activity. Photons can be scattered or absorbed as they travel through rock, but this is far less likely in the gaps, especially if the gaps are filled with air. This means that diamond detection PET, as opposed to PET imaging in other fields such as the medical field, has the unique characteristic that the activity of a given volume is a rough proxy for the chance that the photons will scatter or be absorbed in that volume.

As an aside, it will be appreciated that medical PET typically images function. These corrections require some input of the form. There is some imaging of tissue in proportion to its function or metabolism. However, to fully implement this correction algorithm, it is necessary to also acquire information of form. MinPET would image form, as all components of the object to be studied contain some isotopic species that can be activated to a PET isotope. Therefore all minerals in the sample will be activated to some extent to be PET emitters, and hence be quantitatively imaged.

Traditionally, correcting for scattering or attenuation in traditional PET imaging therefore requires additional information about the structure and composition of objects being scanned, which can be obtained by a different and complimentary companion scanning technique, such as CAT scanning (using X-rays) or magnetic resonance imaging (MRI). In diamond imaging PET, however, the PET reconstructed image itself can be used to obtain information about scattering and attenuation. In the case of medical PET, one would provide the companion structural information by an alternate technique as described. In the case of improving the reconstruction fidelity in the case of CAT, one would use the approximate 3D imaging of form to direct the reconstruction algorithm to the improvements.

Segmentation can be reliably obtained from an initial reconstruction of the PET image, because there are fewer types of materials, no dependence on isotope uptake (biological function), and a much starker difference in isotope concentrations between materials. For example, a region with low isotope concentration in medical PET could be any of several tissue types, whereas in diamond imaging PET there are, as mentioned above, two primary material types in the field of view: air gaps with no PET activity, and rock/kimberlite which is assumed to be relatively homogeneous. If the kimberlite or host rock is not well approximated as homogenous for Min PET purposes, one can imagine segmenting to additional material types. In the case of Medical PET, one would acquire the form dependent information in a separate process, as described before, and in the case of CAT, it would be available from the previous iteration of the CAT reconstruction.

The above information can be used to employ an iterative reconstruction technique. A system matrix is defined, which relates every voxel in the image to every possible pair of detector elements. The value thereof essentially provides the probability that a positron annihilation in a given voxel will create a LoR in a given pair of detector elements. The system matrix can be iteratively updated during image reconstruction. For instance, the following steps may be followed in iterative reconstruction:

1. A reasonable approximation is made as to the shape of the object being imaged (e.g. the rock is approximated as a uniform flat bed of material). This provides the initial image.
2. The region of interest is converted (segmented) into a voxel-based attenuation map. Each voxel is given a value of 1 if it is believed to contain rock, and 0 if it is believed to contain air.
3. One step of iterative PET reconstruction is performed to update the PET reconstructed image. The value of the system matrix for each LoR is corrected based on how many voxels of rock in the attenuation map that LoR would pass through.
4. Based on the current PET image, each voxel in the attenuation map is updated. If there is PET activity above a predefined threshold, then that voxel is deemed to contain rock and is given a value of 1, otherwise it is deemed to contain air and is given a value of 0.
5. The process is then repeated from step 3 above.

The voxels in the attenuation map may be the same size as the PET image voxels, or a different size. For instance, it may be desirable to use more coarse attenuation map voxels to increase computational speed.

In the above algorithm, as the reconstructed image converges, it becomes possible to differentiate the outlines of rocks, which means that the attenuation map grows more accurate over time. This in turn improves the quality of the PET reconstruction. This technique is explained in more detail below, with reference to FIGS. 7 to 10.

A ML-EM (Maximum Likelihood-Expectation Maximisation) algorithm may be employed for image reconstruction. In order to use the ML-EM algorithm, the timestamp of each LoR is used to transform its position from the rock's frame of reference to the frame of reference of the belt. LoRs with similar orientations (as measured by spherical coordinate angles $\phi$ and $\theta$) are binned together to form a set of projections, characterised by the midpoint $\phi$ and $\theta$ values, and two coordinates to denote position along the central plane between the detectors, u and v. For notational simplicity, a single index, j, is used to label the projection elements, so the set of all projections in the 4D sinogram is denoted $y_j$, where j runs over all combinations of the projection variables, u, v, $\phi$ and $\theta$.

The algorithm commences with an initial guess (randomly generated) as to the distribution of PET isotopes within a given volume to be processed, denoted by $x_i^{(0)}$, where the index i runs over all the voxels in the volume under consideration. In the simplest form of the ML-EM algorithm, image reconstruction proceeds according to:

$$x_i^{(n+1)} = x_i^{(n)} \cdot \frac{1}{\sum_j A_{ij}} \cdot \sum_j A_{ij} \frac{y_j}{\sum_k A_{kj} x_k^{(n)}} \quad (2)$$

where:
$x_i^{(n)}$ is the value of voxel i after n iterations,
$A_{ij}$ is the "system matrix", which gives the probability that PET events in voxel i gives rise to detections in projection element j, and
$y_j$ represents detector data, binned as described above.

The formula (2) can be understood as comprising several steps. Given the current PET isotope data, $x_i^{(n)}$, the data is forward projected to see what would be detected if this were the true PET isotope distribution, for a given projection element j. The forward projection uses the system matrix, A:

jth forward projection =

$$z_j = \sum_k A_{kj} x_k^{(n)} \text{ Forward projection } j = \hat{y}_j = \sum_k A_{kj} x_k^{(n)}$$

The forward projected data $z_j$ is then compared to the actual data $y_j$ by taking the ratio:

$$\frac{y_j}{\sum_k A_{kj} x_k^{(n)}}$$

A correction to a given voxel is then calculated by taking the sum of the corrections from each projection element j:

$$\left(\frac{1}{\sum_j A_{ij}}\right) \sum_i A_{ij} \frac{y_j}{\sum_k A_{kj} x_k^{(n)}} \quad (3)$$

In (3) above, the term in brackets is a normalisation factor. The sum term on the right is the back projection of the ratio of the true detected data to the forward projected data. This overall correction is then applied to the current guess $x_i^{(n)}$ to obtain the next guess $x_i^{(n+1)}$. This step is known as "backward projection".

The success of the ML-EM technique relies upon being able to forward and backward project accurately. In other words, given a particular isotope and kimberlite distribution, one must be able to provide a good approximation of what would be captured by the detector elements of the detector arrangement. One must then be able accurately to propagate corrections back to the image for the next iteration.

In the simplest reconstruction procedure, the system matrix $A_{ij}$ is zero everywhere except where a given voxel i lies directly on the path of a projection element j. This will not converge to an accurate image, because, in reality, what is detected is affected by factor such as:
attenuation, which decreases the number of LoRs in a projection element according to the amount of attenuating material along that projection element;
random coincidences, which lead to background LoRs throughout the system; and
scattering, which leads to events that originate in one projection element being detected in another.

In order more accurately to construct the PET reconstructed image, equation (2) must be updated to take these effects into account. There are various ways to do this. One way is to "correct" the detected data to calculate what would have been detected had these effects not been present. For example, equation (2) can be extended to:

$$x_i^{(n+1)} = x_i^{(n)} \cdot \frac{1}{\sum_j A_{ij}} \cdot \sum_i A_{ij} \frac{T_j(N_j(y_j - R_j) - S_j)}{\sum_k A_{kj} x_k^{(n)}} \quad (4)$$

where:
$R_j$ is the expected number of random coincidences detected by projection element j;
$S_j$ is the expected number of scattered LoRs detected by projection element j;
$T_j$ is a factor that captures how much the number of LoRs in projection element j has been decreased due to attenuation; and
$N_j$ is a normalization correction.

Another way to conceptualise scattering and attenuation correction is to embed these effects into the system matrix itself:

$$A_{ij} \rightarrow A_{ij} \cdot T_{ij} + S_{ij} \quad (5)$$

where:
$S_{ij}$ denotes the probability that a source isotope in voxel i leads to a detection within projection element j; and
$T_{ij}$ represents an attenuation factor, that reduces the chance that a PET event from voxel i is detected within projection element j.

As explained above, a LoR is only generated if both back-to-back photons reach their respective detectors on either side. Every point in space between the two detector elements must therefore be traversed by either one photon or the other. Therefore, the attenuation along a given projection does not depend, at a first approximation, on the position of the source term along the projection. In practice therefore, T is only a function of the projection element j, and not which voxel along it:

$$T_{ij} \rightarrow T_j$$

The system matrix may, in principle, be extremely large. For instance, in a 20 cm×20 cm×20 cm volume with a resolution of 2 mm, the are 1,000,000 voxels. A 4D sinogram might have 4000 different angle bins, with u and v values ranging up to 100, for a total of 40,000,000 projection elements. The system matrix in such a case therefore has in the region of $4 \times 10^{13}$ values. This may typically be intractable to store, and too computationally expensive to process if each one of the potential values are generated in real-time. Iterative techniques therefore rely on the fact that most values of $A_{ij}$ are zero, which reduces the number of calculations. Scattering can occur at any angle, so in principle all values of $S_{ij}$ are non-zero. In order to keep the calculation tractable, one must simplify this, for example considering only an average scattering rate that depends on angle, in which case $S_{ij}$ can be treated similarly to $R_j$ equation (4), or only considering scattering to nearby projection elements, in which case $S_{ij}$ serves to "broaden" $A_{ij}$ by increasing the set of voxels that contribute to a given detector element.

It is important to consider the distribution of attenuating material in the image, which determines $T_j$, and can have input into $S_{ij}$ (depending on how the scattering is modelled). "Attenuation" is used herein in the broad sense of how likely both photons from an annihilation event are to reach the detectors on either side without significant changes, e.g. in direction. This is broader than the traditional use of the term "linear attenuation", which tells whether a particle is absorbed or not. To determine the attenuation, the concept of an "attenuation map" is introduced, which is a 3D image of the object volume, where every voxel contains information about how attenuating the material within that voxel is.

$$A_{ij} \rightarrow A_{ij} T$$

In diamond imaging PET, one has the advantage that the volume under consideration can be split, to a first level of approximation, into kimberlite or air (diamonds are small enough to ignore for this calculation). Only one of these, the kimberlite, is a potential source term for PET activity. It is therefore possible to calculate the attenuation $T_j$ using the information contained in the PET scan. An example of the general scheme is illustrated by the flow diagram 30 in FIG. 7. The blocks in solid lines denote steps which are specific to the method in accordance with embodiments of the invention, while blocks in broken lines are part of the standard ML-EM procedure.

As explained above, the algorithm commences with an initial guess (randomly generated) as to the distribution of PET isotopes within a given volume to be processed (see step 32).

Figure 8:
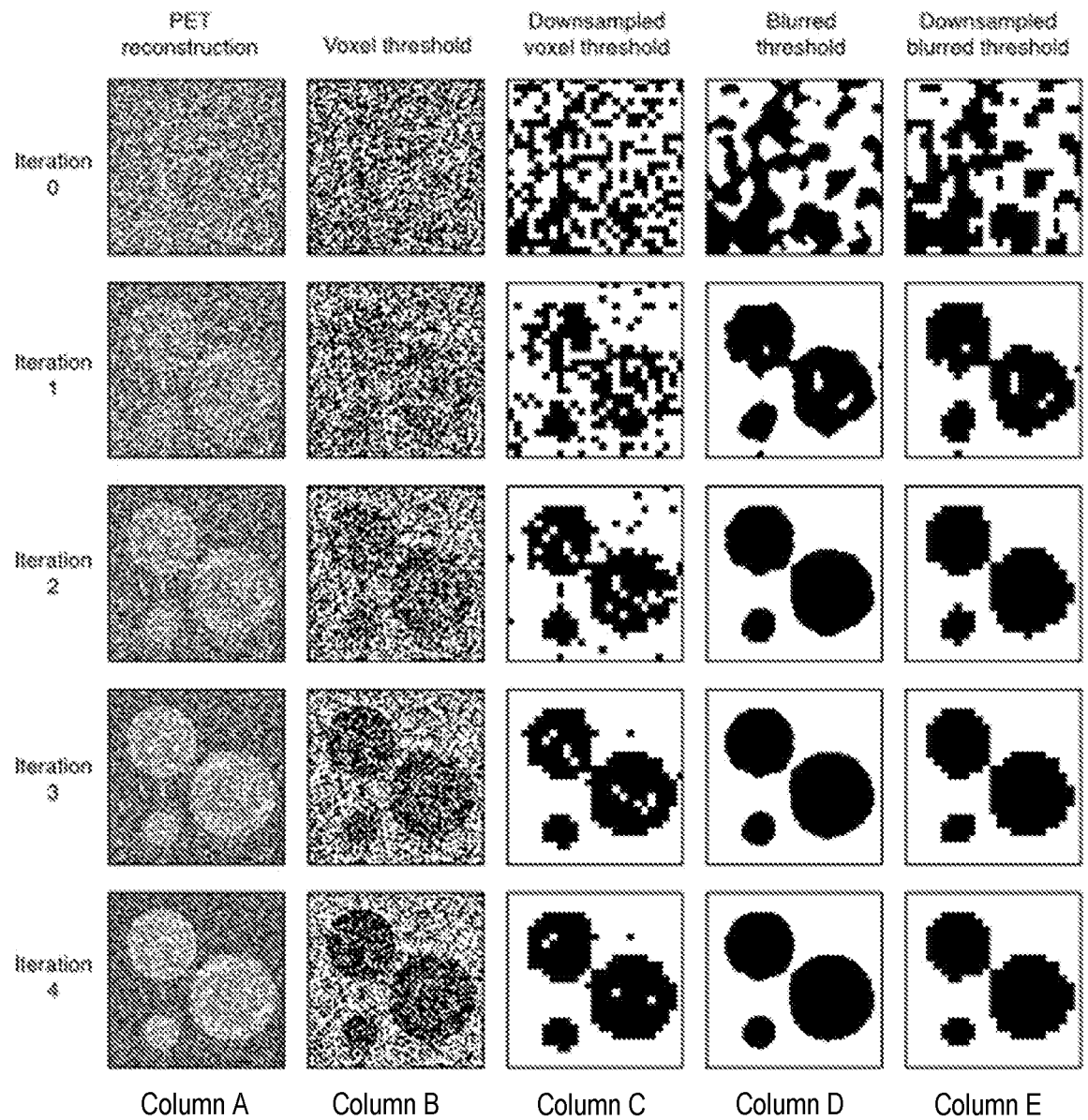
FIG. 8 shows examples of segmentation algorithms which may be employed in embodiments of the invention to assist with PET image reconstruction.

Then, at step 34, image segmentation is carried out as described above to define the attenuation map. FIG. 8 provides examples of the image segmentation step 34. In FIG. 8, Column A represents a PET reconstructed image that is being iteratively generated, converging from initial noise to an image of three rocks. It will be appreciated that this is not a real PET image (as the real image is 3D), but a simulated 2D image for illustration purposes. The remaining four columns show different approaches to segmenting this image to obtain an attenuation map.

Column B provides arguably the simplest method, where a threshold is calculated, and each voxel is classed as kimberlite (coloured black) if it exceeds the threshold, and otherwise it is classed as air (coloured white). The resulting attenuation map is relatively noisy, and does not accurately represent the objects in the image, even after 4 iterations, as is evident from Column B in FIG. 8.

Column C shows a down-sampled attenuation map. In this case, the voxels are down-sampled by a factor of 4, i.e. each 4×4 patch of the original PET image gives rise to one voxel in the attenuation map. A similar threshold filter is then applied to the down-sampled map. This has two advantages. Firstly, the down-sampling serves to remove some of the noise, compared to the images in the second column. Secondly, a lower resolution attenuation map will allow faster calculations of the attenuation correction to the system matrix.

Column D applies more sophisticated filters. The image is first gaussian blurred twice, then a threshold applied. Finally, Column E follows the same gaussian blurring procedure, but then down-samples as in Column C before applying the threshold. Other image segmentation techniques known in the art can be applied. It will be understood that the more sophisticated techniques should perform better, but come at the cost of computational time.

For each j, the attenuation map is used to calculate $T_j$, which, as explained above, is an attenuation factor that captures how much the number of LoRs in projection element j has been decreased due to attenuation (step 36).

To update the system matrix (step 38 in FIG. 7), attenuation correction may be applied to the system matrix. This can be applied either in the approach from equation (4) or that in equation (5).

Figure 9:
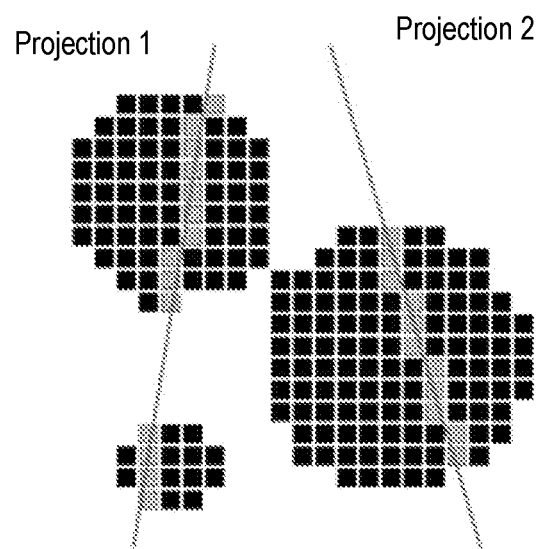
FIG. 9 shows a conceptual illustration of the manner in which voxels may be counted in an attenuation map, in accordance with embodiments of the invention.

FIG. 9 illustrates a 2D analogue of a simple algorithm to follow to calculate the attenuation for a given projection. The pixels that are shown are a zoomed in view of the bottom right attenuation map in FIG. 8. A line is drawn along each projection. The 3D attenuation map is then split into x-y layers along the direction joining the detectors, z. For each layer, the voxel that is closest to the line is found, by finding the voxel centre with the closest horizontal distance to the x,y position of line at that layer. Then, the total number of voxels that are segmented into rock are counted. For projection element 1 in FIG. 9, this total is 14, and for projection element 2 it is 11. A correction is then applied to this count for oblique lines. If the angle between a given projection element and the vertical is q, then the voxel count is be multiplied by 1/cos(q). The corrected voxel count approximates the path length through kimberlite for the projection.

$$\text{Path length } p = \frac{Nw}{\cos(\theta)} \quad (6)$$

where p is the path length in cm, N is the number of voxels traversed and w is the voxel width.

Once the path length through kimberlite is known, the attenuation of photons can be calculated. The standard linear attenuation formula is:

$$I = I_0 e^{-\mu x} \quad (7)$$

where $I_0$ is uncorrected intensity of photons, I is the intensity of photons corrected for attenuation and m is the linear attenuation coefficient for the given material.

Both absorption and scattering can prevent the detection of an accurate LoR. This is known as "extinction" in the context of measuring a narrow pencil beam of radiation. The extinction of photons within rock can be measured experimentally. One possible method is to place a point source containing a PET isotope between two small detector elements, and to measure the rate of detected LoRs. Slabs of kimberlite of known widths are then successively placed in the path of the LoR, allowing the LoR event rate to be plotted against kimberlite width. This data can be fitted with a function of the form of (6), to deduce an effective attenuation coefficient $m_{\text{eff}}$. Then, for each projection element j, the path length $p_j$ is found according to equation (6), and then the attenuation $T_j$ is $$T_j = e^{-\mu_{\text{eff}} p}$$

If a decaying exponential does not fit the data when the above graph is constructed, other functional forms can be used to relate the path length to the rate of LoR detection. This can also be done in a computer by employing, e.g., Geant4 simulations of gradually increasing rock diameter. Aside from quantifying attenuation, this experiment is a useful method of benchmarking the Geant4 simulations performance when it comes to accurately handling photon transport through kimberlite.

It will be appreciated that more sophisticated methods of calculating the path length are possible. For example, instead of counting one voxel per layer, all voxels intersected by the projection can be considered, and the path length of the projection through each voxel calculated for a more accurate result. This calculation must be performed for each one of a large number of projections per iteration, per volume, in real time. The algorithm that is selected must therefore take into account computational time as well as accuracy, so a quicker algorithm might be preferred to a more accurate one, based on the specifications of a particular deployment.

Figure 10:
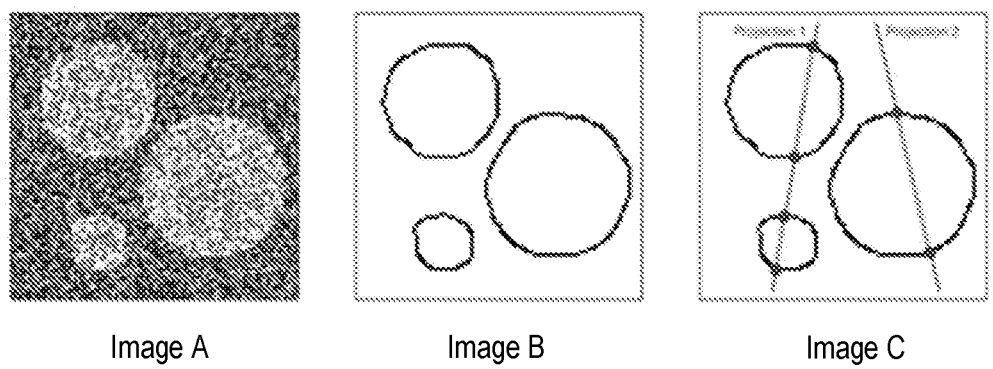
FIG. 10 shows a conceptual illustration of the manner in which path length may be determined by means of edge detection, in accordance with embodiments of the invention.

An alternate method of determining path length is shown in FIG. 10. Image A in FIG. 10 is the bottom image from Column A in FIG. 8. An edge detection algorithm is used to detect the edges of kimberlite rocks, as shown in Picture B. In this case, the Canny algorithm was used for edge detection. The intersection points between projections and edges are found (shown as dots on the edges of the rocks in Picture C), and these are used to calculate the path length through kimberlite. This is performed in three dimensions.

Combinations of different techniques can also be used. For example, the edge detection algorithms may not be able to find edges that fully enclose volumes in low quality images, for example images that are available at low projection counts. For instance, a volume-based segmentation technique at a low iteration count may be employed, and then an edge detection based technique at a higher iteration count may be used subsequently.

The method may further be generalised to more sophisticated segmentation in the attenuation map, depending on the most common materials present on the conveyor belt. For example, instead of binary segmentation into kimberlite and air, a four-way segmentation could be performed to generate an attenuation map that differentiates between air, two types of kimberlite and country rock, each of which has a different attenuation coefficient or attenuation factor. This is only feasible if the PET concentrations of the different materials are significantly different so as to allow differentiation of material.

Once the system matrix has been updated, the data is forward projected (step 40 in FIG. 7) as described above, and then backward projected (step 42) to calculate an updated source volume serving as the next guess, and the process continues iteratively in this manner.

Scattering may be modelled by including elements in the system matrix that are non-zero for source voxels that are nearby, but not on a direct path along a given projection. This captures the fact that a change in direction of a photon due to scattering can lead to a reconstructed LoR that does not pass through the source point. The chance of scattering is proportional to the path length through kimberlite. Scattering correction may therefore be handled in an analogous way to attenuation correction by first calculating the path length, and then introducing non-zero system matrix elements on a projection by projection basis.

It will be appreciated that there are many variations and extensions of the ML-EM scheme discussed above, for instance OS-EM (ordered subset expectation maximisation), and list mode reconstruction which treats individual LoRs instead of binning them into projections, for increased accuracy at the expense of dealing with a much larger data set. The key aspects of using PET data to construct an attenuation map during the iteration process are not restricted to the basic ML-EM scheme, but may be incorporated into many iterative reconstruction algorithms in a similar manner.

As mentioned above, a PET reconstruction algorithm can be assisted with data fusion technologies by obtaining additional data on the rock stream geometry from other sensor data.

Other data could be available to assist in the creation of an attenuation map. This additional data could either take the place of an algorithm as defined above, or supplement it. Two examples of additional information are video camera feeds and laser point cloud scanning. If incoming material is scanned before or after it enters the detector arrangement, this would provide at least some information about the shape of the kimberlite particles. The information may not be complete or fully accurate, e.g. as there is no way to determine the presence of voids within the kimberlite that are completely shielded from outside view. Nevertheless, a map of the surface of the kimberlite may contain information that could be used to create or assist in the creation of an attenuation map.

If a video feed is used to create a surface map, this may include the fusion of multiple video feeds from different angles. Recreating object shapes from video information at different angles is a well-studied field and various known methods may be employed.

One embodiment of supplementing the PET image derived attenuation map with surface information would be to use the surface information to segment all areas outside the surface as air, and then use the PET image to perform segmentation within the volume surrounded by the surface.

Another source of information about the kimberlite that could be employed is a mass scale. The density of kimberlite is relatively well-characterised. A real-time position dependent scale would therefore provide information about the total volume of kimberlite present in a given area. This information, either alone, or combined with the surface information discussed above, could be used to constrain the possible attenuation maps.

Another technique to reduce image artefacts may be to fill gaps between the objects analysed. There may be various ways to fill voids between rocks. One method is to use a fluid, which is poured into the kimberlite bed. The kimberlite bed is allowed to settle, then passes through the detectors, and then the fluid is recovered on the other side and re-used. Water may be used, but its attenuation is far less than kimberlite, so more accurate results may be obtained by denser fluids, or by using particles in suspension. A ferro-silicon suspension that exceeds kimberlite density may be employed. Another option is the use of kimberlite powder. This is less likely to reach all the voids, but is in plentiful supply in a diamond mine, would not negatively affect rock stability, and would not need extensive water recovery circuits. Fines (kimberlite particulates less than 2 mm in diameter) are ubiquitously produced in the rock crushing and handling process. These are usually removed for the conventional diamond discovery methods. However, they may be retained and used for the above purposes. A vibrating transport belt may endow the fines with a fluid-like quality, and they may then settle rapidly into the void areas between the larger rock.

While introducing extra material to fill voids does not reduce scattering overall, as the new material will also scatter photons, it does reduce the variation of scattering at different positions within the rock. This technique can therefore also potentially help with reducing image artefacts.

Finally, AI can be employed to produce substantially artefact free images by learning how to compensate for attenuation and/or scattering. For instance, a convolutional neural network (CNN) deep learning AI can learn how to eliminate attenuation and scattering effects from a PET reconstructed image by doing post-imaging processing. The CNN may be trained using Geant4 simulated data of various rock phantoms to create realistic images (with attenuation and scattering), which along with ideal images (assuming uniform activity LoRs without scattering/attenuation) could be idealized geometry shapes making up a "true" PET image. In medical PET, the above may not be feasible. There is a large proliferation of possible tissue types present, with no obvious relation between PET source intensity and photon attenuation. In addition, biological tissue is less attenuating than rock. Artefacts within medical images due to scattering and attenuation are therefore likely to be subtle, complex, highly dependent on tissue type and impossible to differentiate from image features.

On the other hand, in diamond detecting PET, with a simplified set of materials with a clear correlation between source intensity and attenuation, and with the stark contrast in attenuation between rock and air, attenuation and scattering induced defects are large and distinct from image features. A generational neural network could therefore learn the characteristics of such artefacts and generate an image that corresponds to what the image would have looked like without scattering and attenuation. Here again, the ability to generate Geant4 data with "truth" information would be an advantage, as without this, attenuation and scattering free images for the neural network to learn would be difficult to obtain from real-world experiments.

In another embodiment, instead of applying the neural network to an already formed image, it could be used within the iterative reconstruction process. In particular, a neural network could be trained to generate the attenuation map from the current source concentration map, in place of the various threshold and segmentation techniques described above.

Figure 11:
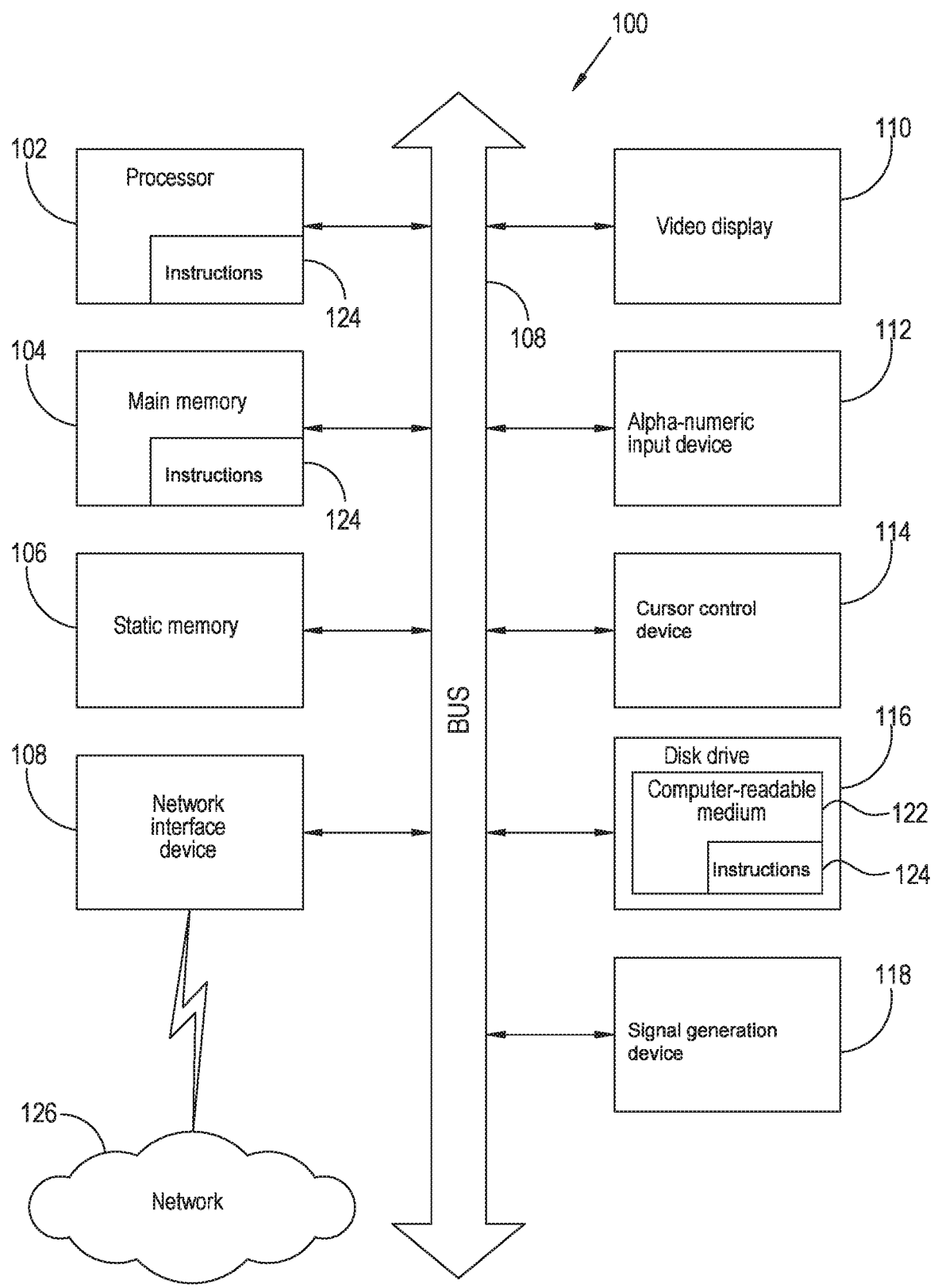
FIG. 11 shows a diagrammatic representation of a machine in the example form of a computer system in which a set of instructions for causing the machine to perform any one or more of the methodologies discussed herein, may be executed.

Referring now to FIG. 11 of the drawings which shows a diagrammatic representation of the machine in the example of a computer system 100 within which a set of instructions, for causing the machine to perform any one or more of the methodologies discussed herein, may be executed. In other example embodiments, the machine operates as a standalone device or may be connected (e.g., networked) to other machines. In a networked example embodiment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated for convenience, the term "machine" shall also be taken to include any collection of machines, including virtual machines, that individually or jointly execute a set (or multiple sets) of instructions to perform any one or more of the methodologies discussed herein.

In any event, the example computer system 100 includes a processor 102 (e.g., a central processing unit (CPU), a graphics processing unit (GPU) or both), a main memory 104 and a static memory 106, which communicate with each other via a bus 108. The computer system 100 may further include a video display unit 110 (e.g., a liquid crystal display (LCD) or a cathode ray tube (CRT)). The computer system 100 also includes an alphanumeric input device 112 (e.g., a keyboard), a user interface (UI) navigation device 114 (e.g., a mouse, or touchpad), a disk drive unit 116, a signal generation device 118 (e.g., a speaker) and a network interface device 120.

The disk drive unit 16 includes a non-transitory machine-readable medium 122 storing one or more sets of instructions and data structures (e.g., software 124) embodying or utilised by any one or more of the methodologies or functions described herein. The software 124 may also reside, completely or at least partially, within the main memory 104 and/or within the processor 102 during execution thereof by the computer system 100, the main memory 104 and the processor 102 also constituting machine-readable media.

The software 124 may further be transmitted or received over a network 126 via the network interface device 120 utilising any one of a number of well-known transfer protocols (e.g., HTTP).

Although the machine-readable medium 122 is shown in an example embodiment to be a single medium, the term "machine-readable medium" may refer to a single medium or multiple medium (e.g., a centralized or distributed memory store, and/or associated caches and servers) that store the one or more sets of instructions. The term "machine-readable medium" may also be taken to include any medium that is capable of storing, encoding or carrying a set of instructions for execution by the machine and that cause the machine to perform any one or more of the methodologies of the present invention, or that is capable of storing, encoding or carrying data structures utilised by or associated with such a set of instructions. The term "machine-readable medium" may accordingly be taken to include, but not be limited to, solid-state memories, optical and magnetic media, and carrier wave signals.

The Inventors believe that embodiments of the present invention may effectively reduce artefacts in PET image reconstruction. In particular, embodiments of the invention may allow a system to correct for scattering and/or attenuation in iterative image reconstruction in mineral detection PET applications.

As mentioned in the section on "Background of the invention", we have used the incarnation of PET in the Mining environment (Min PET) to explain the invention of correcting for attenuation and scattering in the image reconstruction process. However, it should be evident to those skilled in the art that the teachings of the present disclosure apply mutatis mutandis to Medical PET and CT scan processes.

The invention claimed is:

1. A method of reducing artefacts in tomographic image reconstruction, wherein the method is carried out entirely or in part by a computer or computerised system communicatively coupled to a detector arrangement which comprises a plurality of detector elements, wherein the detector elements are configured to detect photons associated with an object, the method comprising:
   generating or obtaining an initial reconstruction of a tomographic image associated with the object, the tomographic image being at least partially based on lines of response (LoRs) detected by the detector arrangement, wherein the tomographic image includes a plurality of voxels associated with a volume or region analysed by the detector arrangement;
   defining or obtaining a system matrix which relates each voxel in the tomographic image to the detector elements;
   generating or obtaining an attenuation map, wherein the attenuation map is based on the tomographic image and is defined by a plurality of voxels, each voxel of the attenuation map containing voxel information relating to a degree or probability of attenuation and/or scattering associated with that voxel;
   performing one iteration of an iterative tomographic reconstruction algorithm to update the tomographic image, wherein performing the iteration includes updating the system matrix based on the voxel information of the attenuation map;
updating the attenuation map based on the updated tomographic image; and
repeating the one iteration of the reconstruction algorithm and the updating of the attenuation map until the tomographic image converges to define a tomographic reconstructed image, thereby reducing artefacts in the tomographic image by compensating for, or taking into account, attenuation and/or scattering of the photons associated with the object.

2. The method as claimed in claim 1, wherein the method comprises using a trained machine-based learning imager to generate the reconstructed tomographic image, wherein the imager is trained at least with computer simulated images and/or object data from a computer implemented simulator to compensate for, or take into account, attenuation and/or scattering of the photons emitted from the object, thereby to reduce artefacts in the reconstructed tomographic image.

3. The method as claimed in claim 1, wherein the method comprises a prior step of filling voids between object(s) with predefined material or materials prior to analysing the object(s) with the detector arrangement.

4. The method as claimed in claim 1, wherein the method comprises using additional sensor data to generate, obtain and/or update the attenuation map.

5. The method as claimed in claim 4, wherein the additional sensor data is based on one or both of video camera feeds and laser point cloud scanning.

6. The method as claimed in claim 1, wherein reducing artefacts in the tomographic image by compensating for, or taking into account, attenuation and/or scattering of the photons associated with the object comprises reducing artefacts in a positron emission tomography (PET) image reconstruction by compensating for, or taking into account, attenuation and/or scattering of photons emitted from the object.

7. The method as claimed in claim 1, wherein the tomographic image is in a form of a PET image associated with the object, wherein the detector elements are configured to detect photons emitted from an object as a result of positron annihilation due to irradiation of the object with photons of a predetermined energy, wherein the PET image is indicative of a PET isotope density distribution in a volume or region analysed by the detector arrangement.

8. The method as claimed in claim 7, wherein the system matrix relates each voxel in the PET image to every possible pair of detector elements.

9. A system for reducing artefacts in tomographic image reconstruction, wherein the system comprises a computer or computerised system communicatively coupled to a detector arrangement which comprises a plurality of detector elements, wherein the detector elements are configured to detect photons associated with an object, wherein the computer or computerised system is configured to:
generate or obtain an initial reconstruction of a tomographic image associated with the object, the tomographic image being at least partially based on lines of response (LoRs) detected by the detector arrangement, wherein the tomographic image includes a plurality of voxels associated with a volume or region analysed by the detector arrangement;
define or obtain a system matrix which relates each voxel in the tomographic image to the detector elements;
generate or obtain an attenuation map, wherein the attenuation map is based on the tomographic image and is defined by a plurality of voxels, each voxel of the attenuation map containing voxel information relating to a degree or probability of attenuation and/or scattering associated with that voxel;
perform one iteration of an iterative tomographic reconstruction algorithm to update the tomographic image, wherein performing the iteration includes updating the system matrix based on the voxel information of the attenuation map;
update the attenuation map based on the updated tomographic image; and
repeat the one iteration of the reconstruction algorithm and the updating of the attenuation map until the tomographic image converges to define a tomographic reconstructed image, thereby reducing artefacts in the tomographic image by compensating for, or taking into account, attenuation and/or scattering of the photons associated with the object.

10. The system as claimed in claim 9, wherein the computer or computerised system is configured to use a trained machine-based learning imager to generate the reconstructed tomographic image, wherein the imager is trained at least with computer simulated images and/or object data from a computer implemented simulator to compensate for, or take into account, attenuation and/or scattering of the photons emitted from the object, thereby to reduce artefacts in the reconstructed tomographic image.

11. The system as claimed in claim 9, wherein the computer or computerised system is configured to use additional sensor data to generate, obtain and/or update the attenuation map.

12. The system as claimed in claim 11, wherein the additional sensor data is based on one or both of video camera feeds and laser point cloud scanning.

13. The system as claimed in claim 9, wherein the system is configured to reduce artefacts in a positron emission tomography (PET) image reconstruction by compensating for, or taking into account, attenuation and/or scattering of photons emitted from the object.

14. The system as claimed in claim 9, wherein the tomographic image is in the form of a PET image associated with the object, wherein the detector elements are configured to detect photons emitted from an object as a result of positron annihilation due to irradiation of the object with photons of a predetermined energy, wherein the PET image is indicative of a PET isotope density distribution in a volume or region analysed by the detector arrangement.

15. The system as claimed in claim 14, wherein the system matrix relates each voxel in the PET image to every possible pair of detector elements.

16. The system as claimed in claim 9, wherein the system comprises the detector arrangement.

17. The system as claimed in claim 9, wherein the system is part of a diamond mine processing system.

18. A computer program product including at least one non-transitory computer-readable medium having stored thereon at least one computer program which, when executed by a computer or a computerised system, causes the computer or computerised system to perform a method of reducing artefacts in tomographic image reconstruction, wherein the computer or computerised system is communicatively coupled to a detector arrangement which comprises a plurality of detector elements, wherein the detector elements are configured to detect photons associated with an object, wherein the computer program product causes the computer or computer system to:
generate or obtain an initial reconstruction of a tomographic image associated with the object, the tomographic image being at least partially based on lines of response (LoRs) detected by the detector arrangement, wherein the tomographic image includes a plurality of voxels associated with a volume or region analysed by the detector arrangement;

define or obtain a system matrix which relates each voxel in the tomographic image to the detector elements;

generate or obtain an attenuation map, wherein the attenuation map is based on the tomographic image and is defined by a plurality of voxels, each voxel of the attenuation map containing voxel information relating to a degree or probability of attenuation and/or scattering associated with that voxel;

perform one iteration of an iterative tomographic reconstruction algorithm to update the tomographic image, wherein performing the iteration includes updating the system matrix based on the voxel information of the attenuation map;

update the attenuation map based on the updated tomographic image; and repeat the one iteration of the reconstruction algorithm and the updating of the attenuation map until the tomographic image converges to define a tomographic reconstructed image, thereby reducing artefacts in the tomographic image by compensating for, or taking into account, attenuation and/or scattering of the photons associated with the object.

\* \* \* \* \*